(12) United States Patent
Ishii et al.

(10) Patent No.: US 9,828,058 B2
(45) Date of Patent: Nov. 28, 2017

(54) SWINGARM SUPPORTING STRUCTURE FOR MOTORCYCLE

(71) Applicant: KAWASAKI JUKOGYO KABUSHIKI KAISHA, Hyogo (JP)

(72) Inventors: Hiroshi Ishii, Kobe (JP); Daisuke Saeki, Kakogawa (JP)

(73) Assignee: KAWASAKI JUKOGYO KABUSHIKI KAISHA, Hyogo (JP)

( * ) Notice: Subject to any disclaimer, the term of this patent is extended or adjusted under 35 U.S.C. 154(b) by 92 days.

(21) Appl. No.: 14/108,916

(22) Filed: Dec. 17, 2013

(65) Prior Publication Data
US 2014/0183837 A1 Jul. 3, 2014

(30) Foreign Application Priority Data
Dec. 27, 2012 (JP) .................................. 2012-285568

(51) Int. Cl.
*B62K 11/00* (2006.01)
*B62K 25/28* (2006.01)
*B62K 11/04* (2006.01)

(52) U.S. Cl.
CPC ............ *B62K 25/283* (2013.01); *B62K 11/04* (2013.01); *B62K 25/286* (2013.01)

(58) Field of Classification Search
CPC ..... B62K 11/04; B62K 25/283; B62K 25/286
USPC ........................... 180/219, 227, 220; 280/284
See application file for complete search history.

(56) References Cited

U.S. PATENT DOCUMENTS

| 4,066,142 A | 1/1978 | Hooper | |
|---|---|---|---|
| 4,139,072 A * | 2/1979 | Dawson | 180/312 |
| 4,265,329 A | 5/1981 | de Cortanze | |
| 5,390,758 A * | 2/1995 | Hunter | B62K 11/04 180/227 |
| 2008/0169149 A1* | 7/2008 | Holroyd | B62K 11/06 180/227 |
| 2010/0193275 A1* | 8/2010 | Song | B62K 11/04 180/219 |

FOREIGN PATENT DOCUMENTS

| GB | 555975 | 9/1943 |
|---|---|---|
| JP | 1-156118 | 6/1989 |
| JP | 1-237276 | 9/1989 |
| JP | 10-115226 | 5/1998 |

OTHER PUBLICATIONS

European Search Report (ESR) issued Feb. 25, 2014 in corresponding European Patent Application No. EP 13 19 7117.

* cited by examiner

*Primary Examiner* — Anne Marie Boehler
(74) *Attorney, Agent, or Firm* — Wenderoth, Lind & Ponack, L.L.P.

(57) ABSTRACT

A swingarm supporting structure can prevent rigidity of a case from becoming excessive and can improve a degree of freedom of design. The swingarm supporting structure includes: a case in which a power unit is stored; and a bracket for freely pivotally supporting a swingarm up and down through a pivot shaft. The swingarm supports an axle, and the bracket is detachably fixed to the case in a fixed direction intersecting the pivot shaft.

17 Claims, 7 Drawing Sheets

SWINGARM SUPPORTING STRUCTURE FOR MOTORCYCLE

BACKGROUND OF THE INVENTION

1. Field of the Invention

The present invention relates to a swingarm supporting structure for a motorcycle.

2. Description of the Related Art

As the swingarm supporting structure for a motorcycle, JP unexamined patent publication No. H10-115226 discloses a structure in which a swingarm is directly supported by a crankcase.

In the motorcycle described in JP No. H10-115226, it is required to enhance rigidity of the crankcase in order to support the swingarm. There is a possibility that a degree of freedom of design of the crankcase is restricted in order to secure the necessary rigidity.

It is an object of the present invention to provide a swingarm supporting structure which can prevent the rigidity of the case from becoming excessive and which can improve the degree of freedom of design.

SUMMARY OF THE INVENTION

A swingarm supporting structure for a motorcycle according to the present invention comprises: a case in which a power unit is stored; and a bracket for freely pivotally supporting a swingarm up and down through a pivot shaft, the swingarm supporting an axle, wherein the bracket is detachably fixed to the case from a fixed direction intersecting the pivot shaft.

Since the bracket is formed separately from the case, it is possible to prevent stresses given from the bracket from being concentrated around the pivot shaft of the case. Therefore, compared with the case where the swingarm is directly supported by the case, it is possible to prevent the rigidity of the case from becoming excessive. Further, the bracket is attached and fixed to the case from an intersecting direction intersecting the pivot shaft. This makes it possible to place the fixed position of the bracket on a surface of the case opposite to the swingarm. Therefore, compared with the case where the fixed position of the bracket is placed on a side surface of the case where the attachment position is relatively limited, options for the fixed position of the bracket can be increased, so that the degree of freedom of design can be improved.

The swingarm supporting structure of the present invention can prevent the rigidity of the case from becoming excessive and which can improve the degree of freedom of design.

DETAILED DESCRIPTION OF THE PREFERRED EMBODIMENTS

Figure 1:
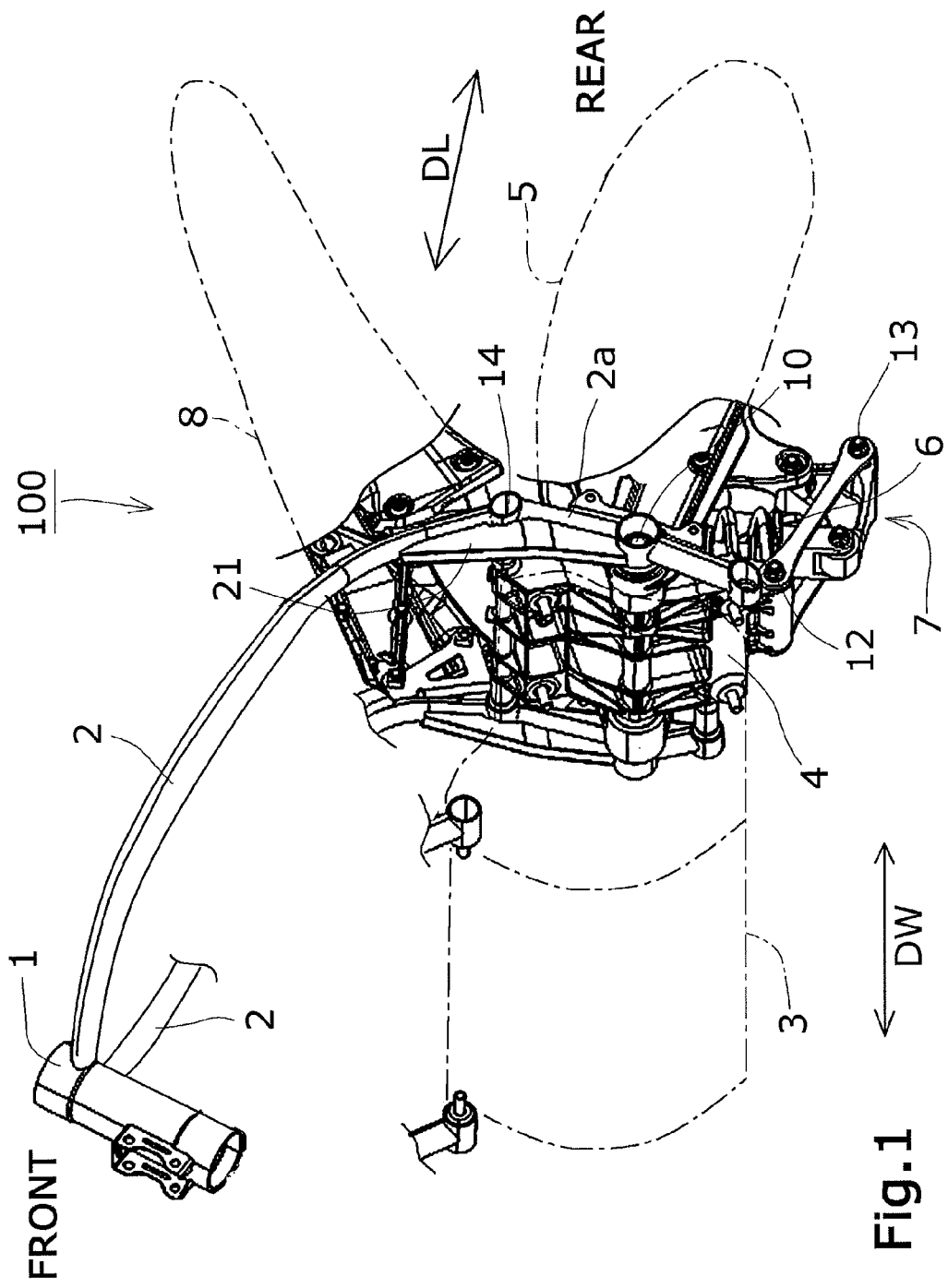
FIG. 1 is a perspective view of a vehicle body frame for a motorcycle as seen obliquely from the front.
Figure 2:
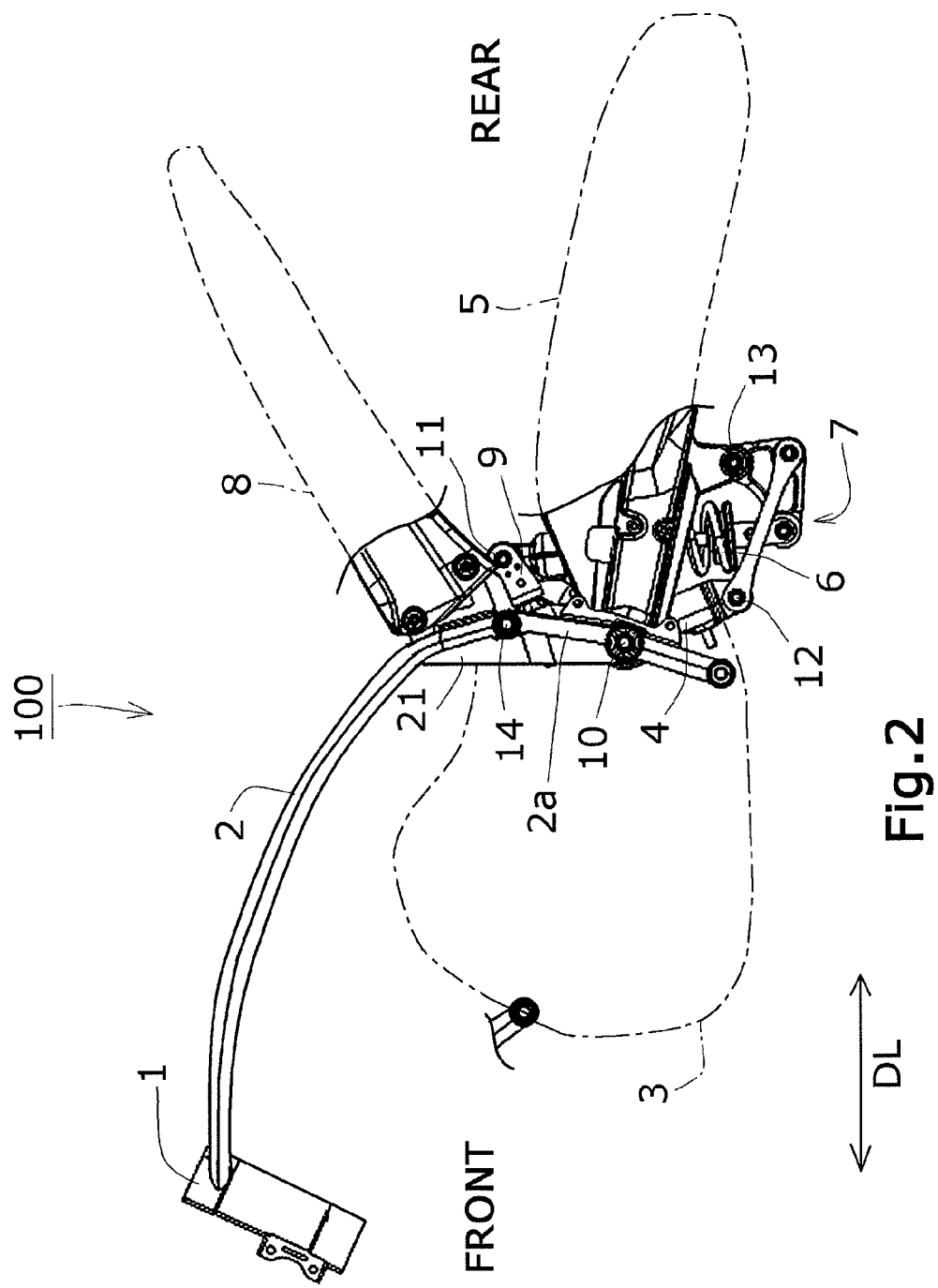
FIG. 2 is a side view of a vehicle body frame for a motorcycle.
Figure 3:
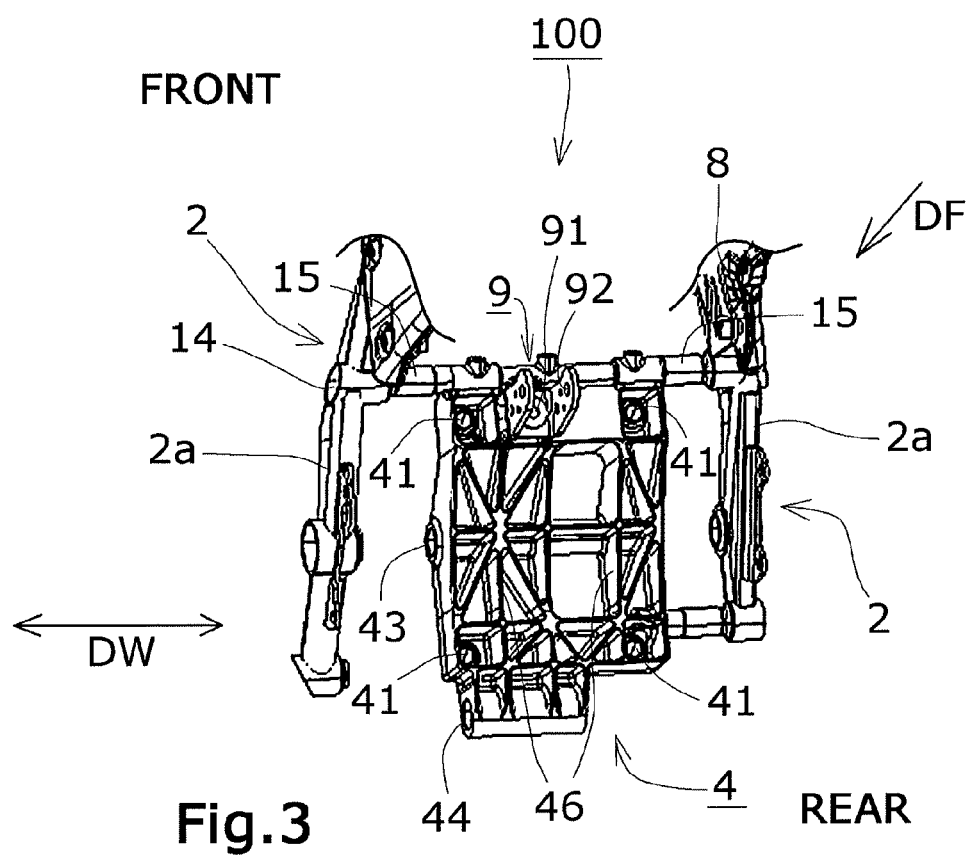
FIG. 3 is a perspective view of the vehicle body frame for a motorcycle as seen obliquely from the rear.

With reference to FIGS. 1-3, a vehicle body frame 100 for a motorcycle will be described. FIG. 1 is a perspective view of the vehicle body frame 100 for a motorcycle as seen obliquely from the front. FIG. 2 is a side view of the vehicle body frame 100 for a motorcycle. FIG. 3 is a perspective view of the vehicle body frame 100 for a motorcycle as seen obliquely from the rear.

A motorcycle of the present embodiment is equipped with the vehicle body frame 100, a swingarm 5, a shock absorber 6, a link mechanism 7, and a rear frame 8. The vehicle body frame 100 is equipped with a head pipe frame 1, two main frames 2, a crankcase 3, and an arm bracket 4. The arm bracket 4 freely pivotally supports a swingarm 5 up and down through a pivot shaft 10. The swingarm 5 supports an axle of a rear wheel. The swingarm 5 is elastically supported by the arm bracket 4 through the shock absorber 6. An upper end portion of the shock absorber 6 is supported by an absorber bracket 9 through an upper support shaft 11. The absorber bracket 9 is fixed to the arm bracket 4. A lower end portion of the shock absorber 6 is connected to the link mechanism 7. The link mechanism 7 is supported by the arm bracket 4 through a lower support shaft 12, and is supported by the swingarm 5 through an arm connecting shaft 13. The rear frame 8 is fixed to the two main frames. The rear frame 8 supports a seat.

The head pipe frame 1 is located at a front end portion of the vehicle body 100, and supports a steering shaft. The two main frames 2 are fixed to the head pipe frame 1 by welding. One of the two main frames 2 extends rearward from the right rear end of the head pipe frame 1, and the other of the two main frames 2 extends rearward from the left rear end of the head pipe frame 1. The two main frames 2 are placed at an interval in a vehicle width direction DW, and connected through the head pipe frame 1. The two main frames 2 are not directly weld-connected to each other. That is, there is no cross member to be weld-connected in order to resist elastic deformation of a rear portion 2a of the main frame 2.

The link mechanism 7 connects the swingarm 5 and the lower end portion of the shock absorber 6, and a lever structure is formed by a plurality of link members, which are connected so as to be angularly displaceable from one another. That is, in the link mechanism 7, a point of fulcrum is set at a position connected to the bracket 4, a point of effort is set at a position connected to the swingarm 5, and a point of action is set at a position connected to the shock absorber 6. By setting the dimensions of the link members as necessary, the displacement amount and displacement force of the swingarm 5 are made different, so that they can be transmitted to the shock absorber 6.

The crankcase 3 is fixed to the two main frames 2 using bolts. At this time, the crankcase 3 serves as a cross member for connecting the two main frames 2 in the vehicle width direction DW.

The arm bracket 4 is detachably fixed to the crankcase 3 in the fixed direction DF using bolts that are fastening members. The fixed direction DF indicates a direction in which the arm bracket 4 is attached to the crankcase 3, which is a direction intersecting the pivot shaft 10. The fixed direction DF indicates a direction from the rear to the front in the present embodiment. The rear portions 2a of the two main frames 2 are fixed to the arm bracket 4 from the vehicle width direction DW using bolts. When the two main frames 2 are fixed to only the head pipe frame 1 and the crankcase 3, the rear portions 2a of the two main frames 2 are in a state in which they can be bent further in the vehicle width direction DW compared with a case in which the main frames 2 are directly weld-fixed by the cross member at an intermediate or rear end portion in a front-and-rear direction. Therefore, when the main frames 2 are fixed to the arm bracket 4 using the bolts, the main frames 2 deform so as to be able to tolerate an assembly/manufacturing error, so that generation of large stresses is prevented.

Although not shown in the drawing, the main frame 2 is formed by combining a plurality of pipe materials, and fixing them by welding. The material of the head pipe frame 1 and the main frame 2 is iron. The arm bracket 4 is formed by cutting on the basis of a molded product. In the present embodiment, the molded product before cutting is a casting by die-casting. Since the arm bracket 4 defines a position of the pivot shaft 10 with respect to the vehicle body frame 100, it is a part that requires accuracy. The arm bracket 4 before cutting is formed in an integral casting by die-casting, whereby it is easy to secure the accuracy of the arm bracket 4. The crankcase 3 is a casting formed by gravity casting. In the present embodiment, the crankcase 3 has a function of storing a crankshaft, and also serves as a functional part subjected to a load applied to the swingarm 5 through the arm bracket 4.

The main frames 2 support the crankcase 3 from above.

The rear portion 2a of the main frame 2 extends from above to below while curving so as to protrude rearward. A reinforcing plate 21 is fixed to this curved portion. The reinforcing plate 21 has a triangular or arc-like shape in accordance with the curved shape of the rear portion 2a, and extends upward from the periphery of the pivot shaft 10. The reinforcing plate 21 improves strength of the main frame 2 without increasing the size of the main frame 2 in the vehicle width direction DW.

Figure 4:
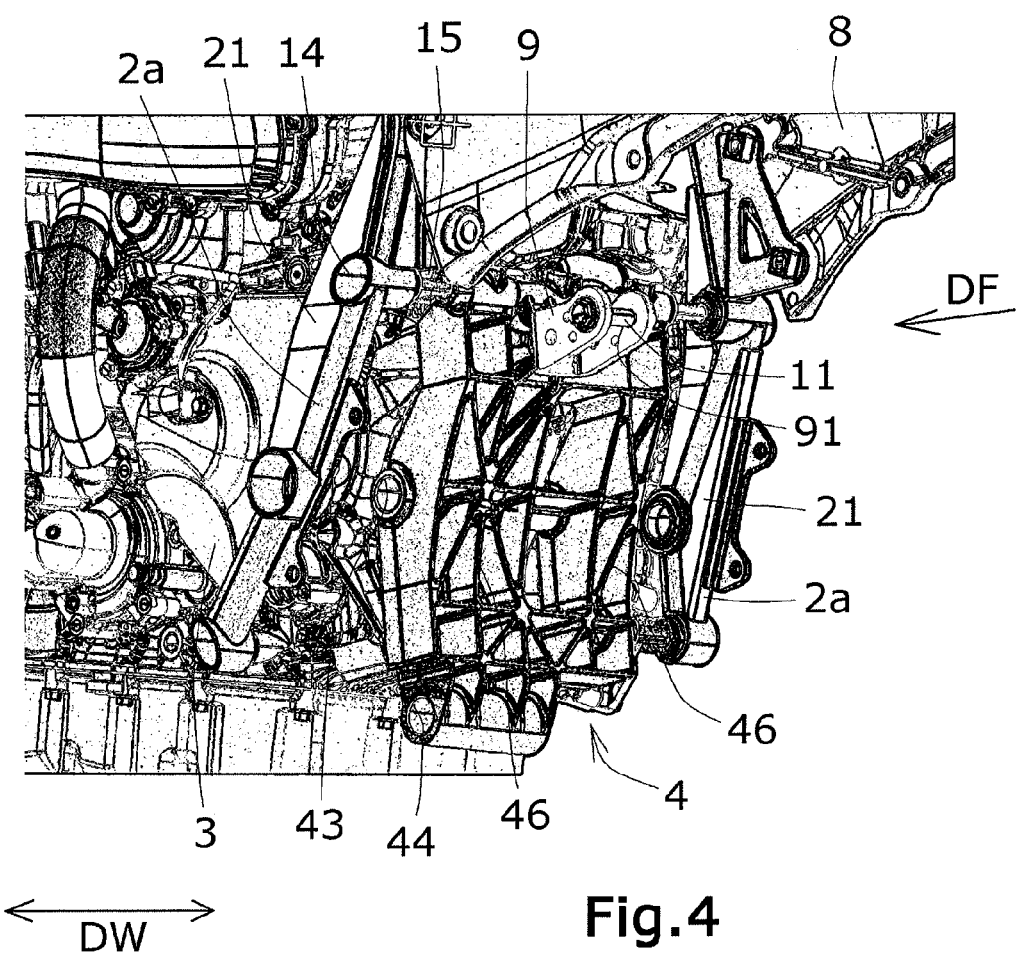
FIG. 4 is a perspective view of a crankcase and an arm bracket fixed to the crankcase as seen obliquely from the rear.
Figure 5:
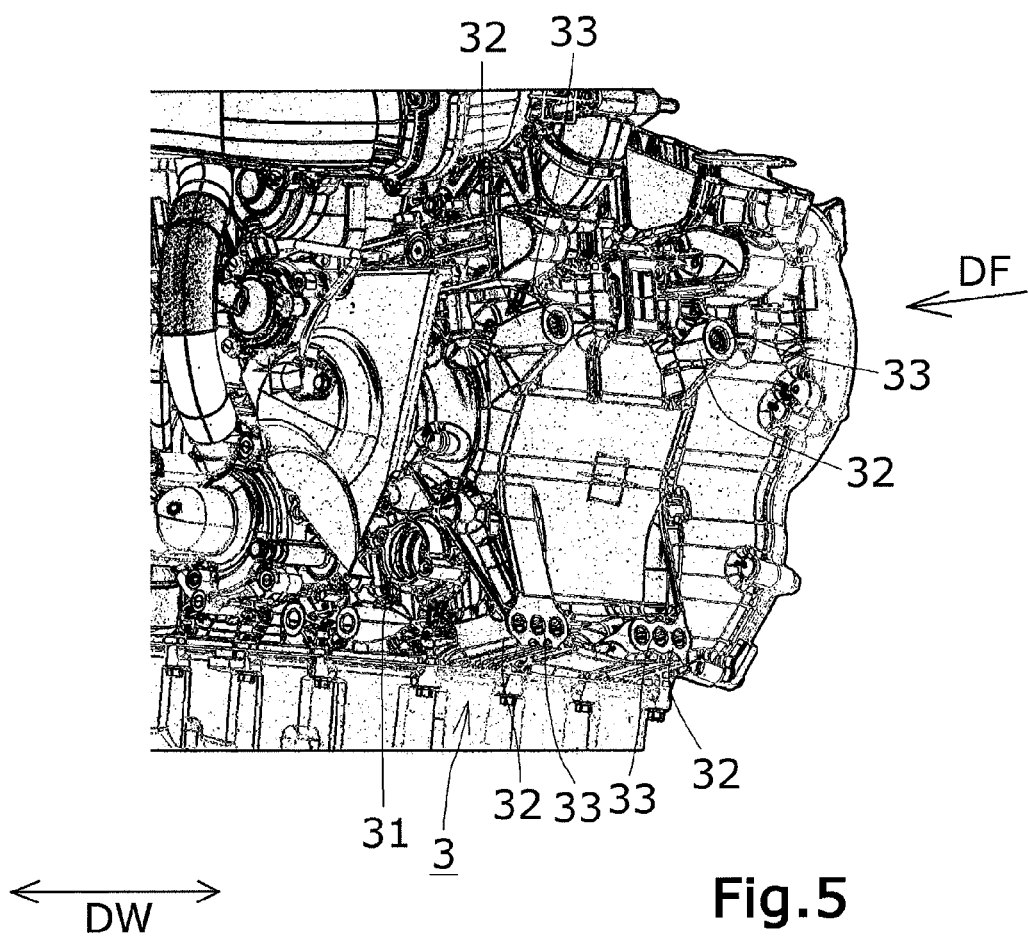
FIG. 5 is a perspective view of the crankcase as seen obliquely from the rear.
Figure 6:
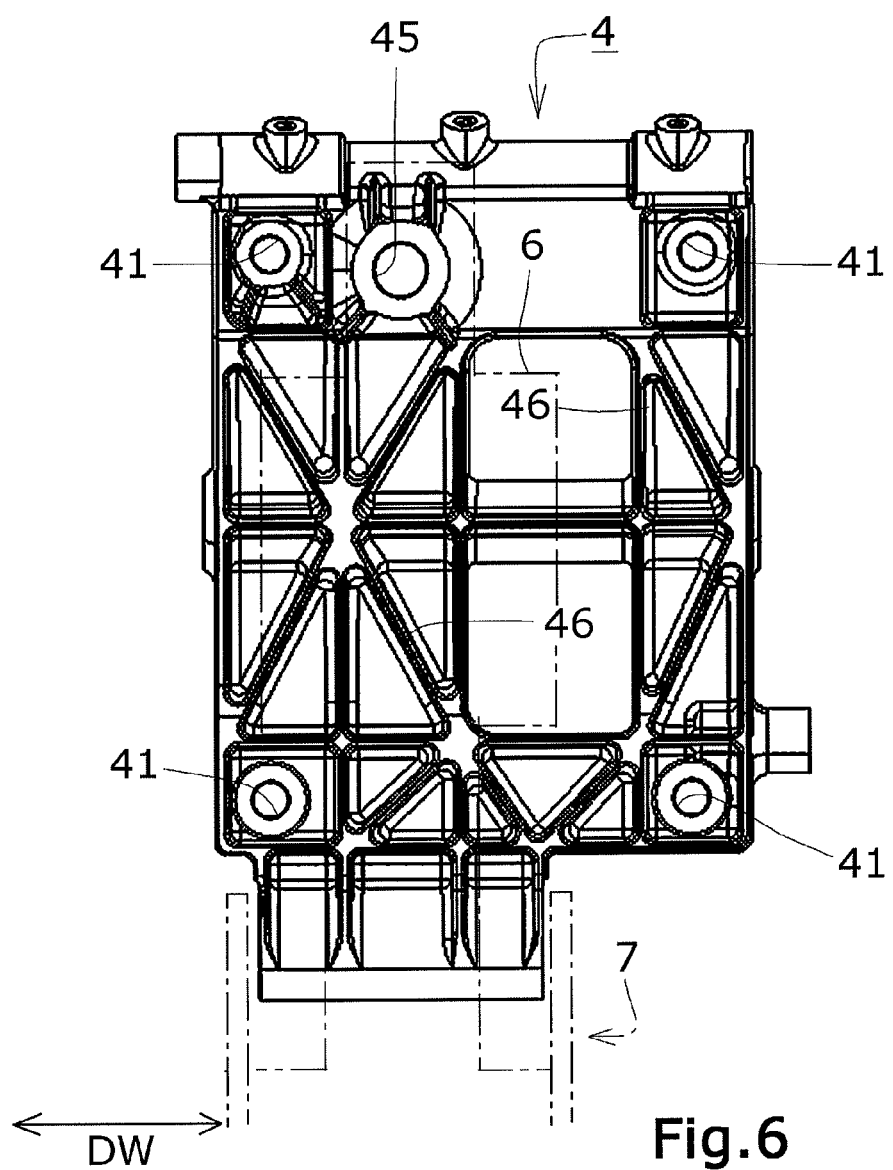
FIG. 6 is a rear view of the arm bracket.

With reference to FIGS. 4-6, fixing the arm bracket 4 to the crankcase 3 will be described. FIG. 4 is a perspective view of the crankcase 3 and the arm bracket fixed to the crankcase 3 as seen obliquely from the rear. In FIG. 4, the arm bracket 4 is located at the rear of the crankcase 3, and fixed to the crankcase 3 using the bolts.

FIG. 5 is a perspective view of the crankcase 3 as seen obliquely from the rear. The crankcase 3 has a body portion 31 and four nut portions (fixing portions) 32. In the crankcase 3, those portions which protrude from the body portion 31 in the fixed direction DF are selected as the nut portions 32. The nut portions 32 each have a threaded screw hole 33 formed so as to engage with a threaded shaft of each bolt. The bolt is fastened to the threaded screw hole 33 through the arm bracket 4. An axial direction of the threaded screw hole 33 is the fixed direction DF. When the arm bracket 4 is attached to the crankcase 3, the bolts are respectively fastened to the four nut portions 32.

As shown in FIGS. 4, 5, the nut portions 32 are formed not on a side surface in the vehicle width direction DF of the crankcase 3, but on a rear end surface of the crankcase 3. Therefore, in the vehicle width direction DW, a width of the arm bracket 4 is formed smaller than a width of the crankcase 3. This prevents the dimension in the width direction DW of the vehicle body frame 100 from being increased.

FIG. 6 is a rear view of the arm bracket 4. The arm bracket 4 has four insertion holes 41 for inserting the bolts for fixing the arm bracket 4 to the crankcase 3. An axial direction of each insertion hole 41 is also the fixed direction DF. When seen from the rear, the four insertion holes 41 are respectively placed at vertices. If the four insertion holes 41 are divided with reference to the upper and lower sides, the two insertion holes 41 are placed on the upper side, and the two insertion holes 41 are placed on the lower side. In each of the upper and lower sides, the two insertion holes 41 are placed at an interval in the vehicle width direction DW. The two insertion holes 41 are placed on the left side with respect to the center of the vehicle width direction DW, and the two insertion holes 41 are placed on the right side with respect to the center of the vehicle width direction DW. Therefore, on each of the left and right sides, the two insertion holes 41 are placed at an interval in the upper-and-lower direction. Therefore, on each of the upper-and-lower direction and the left-and-right direction, the arm bracket 4 is firmly fixed to the crankcase 3.

In place of the protruding nut portions 32, through holes are formed in the case 3, and the bracket 4 is fixed to the case 3 by fastening the bracket 4 with bolts and nuts from both sides of the case 3. In this case, threaded screw holes are formed in the case 3, and the bottoms of bolt holes are formed so as to prevent communication with the inside of the case 3, whereby a fluid (oil) inside the case can be prevented from flowing out.

Figure 7:
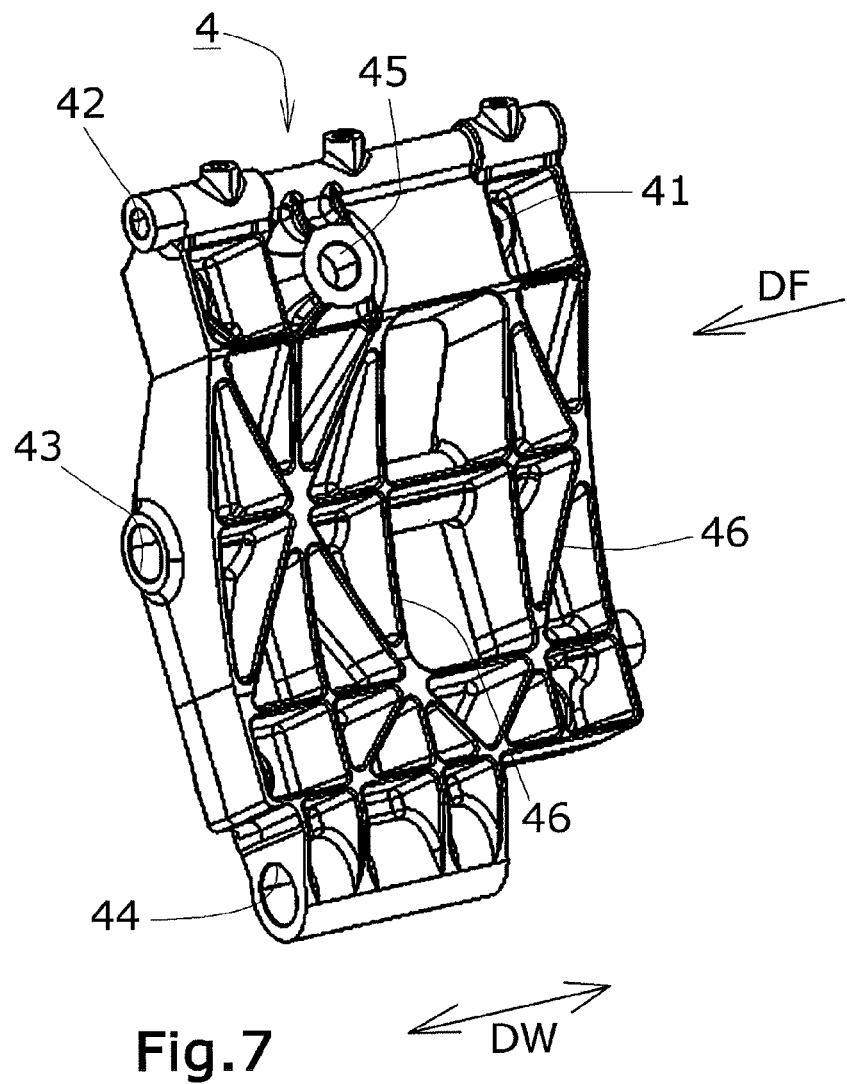
FIG. 7 is a perspective view of the arm bracket when seen from the rear.

With reference to FIGS. 1-4, 7, the arm bracket 4 and the absorber bracket 9 will be described. FIG. 7 is a perspective view of the arm bracket 4 when seen from the rear. In FIG. 7, besides the insertion holes 41, a case fixing portion of the arm bracket 4 is equipped with a frame hole 42, a pivot hole 43, a lower absorber hole 44, and a threaded screw hole 45 of the absorber. The frame hole 42, the pivot hole 43, the lower absorber hole 44 all penetrate the arm bracket 4, and extend in the vehicle width direction DW. The threaded screw hole 45 of the absorber is formed in the arm bracket 4, and extends in the fixed direction DF.

A connection shaft 14 is inserted into the frame hole 42 shown in FIG. 7. The connection shaft 14 extends in the vehicle width direction DW, passes through the frame hole 42, and connects the two main frames 2 and the arm bracket 4. A cylindrical member 15 is placed between the main frame 2 and the arm bracket 4, and the connection shaft 14 is inserted into the cylindrical member 15. The cylindrical member 15 adjusts a separation distance between the main frame 2 and the arm bracket 4.

The pivot shaft 10 is inserted into the pivot hole 43 shown in FIG. 7. The pivot shaft extends in the vehicle width direction DW, passes through the pivot hole 43, and rotatably connects the swingarm 5 to the arm bracket 4. In FIGS. 4 and 7, the pivot hole 43 is placed on a front side of the arm bracket 4 (a tip side of the fixed direction DF), which is placed at a position closer to the crankcase 3. As described above, the pivot shaft 10 for supporting the swingarm 5 is inserted into the pivot hole 43. The swingarm 5 is also a heavy material, and since a position, to which a load of the heavy material is applied, is put closer to the crankcase 3, a position of the center of gravity of the motorcycle is kept in a stable position.

The lower support shaft 12 is inserted into the lower absorber hole 44 shown in FIG. 7. The lower support shaft 12 extends in the vehicle width direction DW, passes through the lower absorber hole 44, and rotatably connects one end portion of the link mechanism 7 to the arm bracket 4.

At a position close to the lower absorber hole 44, which becomes a connection portion for connecting the link mechanism 7 and the bracket 4 (the lower left insertion hole 41), one of the bolts for fixing the bracket 4 to the crankcase 3 is placed. This bolt serves as a bolt placed adjacent to the link, which transmits a force given from the link mechanism 7 to the case 3. Specifically, the bolt placed adjacent to the link is placed on the side to which the link mechanism 7 is offset. Further, the lower absorber hole 44 is placed at an end portion of the bracket, specifically at a lower end portion thereof, and the bolt placed adjacent to the link is also placed on the end portion side of the bracket 4 in which the lower absorber hole 44 is formed, specifically at the lower end portion thereof. This can transmit the force given from the link mechanism 7 to the bracket 4 to the case 3 near the link mechanism 7, so that the rigidity of the bracket 4 can be reduced.

The bracket 4 has an up-and-down extending portion which connects a pair of fixed portions (peripheral portions of the insertion holes 41) extending up and down, and separated up and down. The two up-and-down extending portions are placed left and right at an interval. The bracket 4 is formed with a left-and-right extending portion where the pivot hole 43 is formed, the left-and-right extending portion being connected to the up-and-down extending portion, and extending in the left-and-right direction. Therefore, the bracket 4 at least has a portion formed in a H-shape. The bracket 4 is molded by upper and lower molds that are separated in the fixed direction. This makes it easy to change the thickness, and to attempt the weight reduction while keeping the required strength. The bracket 4 is fixed at least at its two positions at an interval from the center in the left-and-right direction. In the present embodiment, the bracket 4 is fixed at its both end portions in the left-and-right direction. The bracket 4 is fixed at its positions displaced from the pivot shaft 10 in the up-and-down direction. In the present embodiment, the bracket 4 is fixed at its two positions at an interval up and down with respect to the pivot shaft 10.

By making the width in the left-and-right direction of the bracket 4 smaller than the width in the left-and-right direction of the case, the width in the left-and-right direction of the swingarm 5 can be made smaller.

The portion for fixing the shock absorber 6 and the portion for fixing the link mechanism 7 are both displaced to one side with respect to the center in the vehicle width direction DW of the bracket 4, whereby a space on the other side in the vehicle width direction DF can be efficiently used.

The absorber bracket 9 has an insertion hole 91 and an insertion hole 92. The insertion hole 91 is a hole for inserting a bolt that is fixed to the arm bracket 4. The absorber bracket 9 is fixed to the arm bracket 4 using the bolt. The bolt passes through the insertion hole 91, and engages with the threaded screw hole 45 of the absorber. By fastening the bolt, the absorber bracket 9 is fixed to the arm bracket 4. Further, the insertion hole 92 is a hole for inserting the upper support shaft 11. The upper support shaft 11 extends in the vehicle width direction DW, passes through the insertion hole 92, and supports the upper end portion of the shock absorber 6 so that it is angularly displaceable with respect to the arm bracket 4.

Since the absorber bracket 9 is fixed with the bolt, it is detachable to the arm bracket 4. Here, a lever ratio of the shock absorber 6 can be changed depending on the position of the insertion hole 92 in the absorber bracket 9. Therefore, by preparing the plurality of absorber brackets 9 whose positions of the insertion holes 92 are different, the lever ratio can be optionally changed as necessary.

The arm bracket 4 has a plurality of recesses formed in the fixed direction DF, and ribs 46 are formed between adjacent recesses. Therefore, the strength of the arm bracket 4 is secured without increasing the weight of the arm bracket 4.

Forming a subassembly in which the shock absorber 6, the link mechanism 7, and the swingarm 5 are assembled to the bracket 4, and fixing the subassembly to the case 3 can improve assembling performance compared with the case where they are sequentially assembled to the vehicle body.

As shown in FIG. 6, the bolts for fixing the bracket 4 to the case 3 are respectively placed at positions away from a region hidden by the link mechanism 7 and the shock absorber 6 when seen from a bolt insertion direction, namely from the rear of the bracket 4. In other words, the bolts are placed respectively outside the shock absorber 6 in the vehicle width direction DW. By this arrangement, when fixing the bracket 4 to the case 3 in a state in which the shock absorber 6 is fixed to the bracket 4, assembling work can be performed while preventing the bolts from interfering with the shock absorber 6.

An action force (a driving force, a breaking force) generated between a rear wheel and a road surface is transmitted to the case 3 through the wheel, the swingarm 5, and the bracket 4. The above action force acts on the front-and-rear direction of the vehicle body. In the present embodiment, the bolts extend in the front-and-rear direction so that the action force mainly acts on an axial direction of the bolts. This makes it possible to enhance supporting rigidity of the bolts compared with the case where the action force acts on a direction perpendicular to the axial direction of the bolts.

Since the swingarm supporting structure for the motorcycle according to the present embodiment has the above construction, it has the following operation and effect.

[1] The swingarm supporting structure comprises: a case (3) in which a power unit is stored; and a bracket (4) for freely pivotally supporting a swingarm (5) up and down through a pivot shaft (10), the swingarm (5) supporting an axle, wherein the bracket (4) is detachably fixed to the case (3) in a fixed direction (DF) intersecting the pivot shaft.

Since the bracket is formed separately from the case, it is possible to prevent stresses given from the bracket from being concentrated around the pivot shaft of the case. Therefore, compared with the case where the swingarm is directly supported by the case, it is possible to prevent the rigidity of the case from becoming excessive. Further, the bracket is attached and fixed to the case from an intersecting direction intersecting the pivot shaft. This makes it possible to place the fixed position of the bracket on a surface of the case opposite to the swingarm. Therefore, compared with the case where the fixed position of the bracket is placed on a side surface of the case where the attachment position is relatively limited, options for the fixed position of the bracket can be increased, so that the degree of freedom of design can be improved.

[2] The swingarm supporting structure comprises a main frame (2) extending rearward from a head pipe frame (1) and supporting the case (3), and the main frame and the bracket are separately formed.

Since the main frame and the bracket are separately formed, the shape of the bracket can be changed according to the shapes of the main frame and the case. Therefore, the swingarm supporting structure can deal with a main frame and a case, which have different shapes, so that a degree of freedom of production is improved.

Compared with the case where the main frame is formed with the pivot shaft, the size of the bracket can be reduced, and the weight and size of the vehicle can be reduced. Further, the bracket and the main frame can be formed by different forming methods, so that convenience can be improved. For example, in the case where the main frame and the bracket are integrally formed, if both of them are integrally formed by molding, since the size of a mold is increased, workability is poor. If both of them are integrally formed by welding connection, a production error is liable to occur. In the present embodiment, the main frame is formed by weld-connecting pipe materials. This does not require using a mold, and workability can be improved. Also, compared with weld forming, molding the bracket can prevent a positional displacement of the pivot shaft with respect to the case. Further, the bracket can be fixed to the case without being affected by deformation of the frame, which occurs when the main frame is fixed to the case, so that the positional displacement of the pivot shaft with respect to the case can be prevented.

[3] The swingarm supporting structure comprises a plurality of fastening members for fixing the bracket (4) to the case (3), and, when the bracket (4) is fixed to the case (3) with the plurality of fastening members, the plurality of fastening members are placed at an interval, and press the bracket (4) against the case (3) in the fixed direction (DF).

The plurality of fastening members press the bracket together against the case in the fixed direction to fix the bracket to the case. By this arrangement, the bracket is pressed in the same direction regardless of the positions of the bolts, thus making it possible to prevent the bracket from bending due to the positional displacements of the bolts. As a comparative example, in the case where the bracket is fixed to the case from both sides in the vehicle width direction of the crankcase with the bolts, it is necessary to deform the bracket, or to provide a spacer for filling a gap in order to eliminate the gap between the left and the right, i.e., between the bracket and the case. In the case where the bracket is deformed, the pivot shaft cannot be accurately placed. In the case where the spacer is placed, workability is poor. In the present embodiment, in regard to this, as described above, the pressing directions of the bolts are made the same, whereby the condition described in the comparative example can be prevented.

Further, with regard to a contact surface with which the bracket and the case are in contact and which is set for each bolt, it is preferred that all the contact surfaces are placed on a single virtual plane. If the contact surfaces are formed on the same plane, they are insusceptible to errors. In other words, compared with the case where the bracket is fixed to the case at positions on both sides in the left-and-right direction, the contact surfaces can be formed as one common plane. This makes it possible to further suppress the positional displacement of the pivot shaft, while suppressing deformation of the bracket because of being fastened by the bolts.

The plurality of bolts are placed mutually at an interval. For example, positions to be fixed by the bolts are placed respectively on both sides with respect to a divided surface of the crankcase, whereby the bracket can be functioned as a reinforcing member for preventing the crankcase from being divided. Further, the positions to be fixed by the bolts are respectively placed on one side with respect to the divided surface. This makes it possible to remove one of the bracket and the crankcase without removing the bracket from the crankcase.

[4] The bracket (4) comprises a pivot hole (43) for freely angularly displaceably supporting the pivot shaft (10), and in the bracket (4), a portion for forming the pivot hole (43) and a portion for forming a surface in contact with the case (3) are formed on the basis of a molded product.

By forming the bracket from the molded product, it is possible to suppress errors in the respective parts, and also it becomes easy to set the thicknesses thereof, compared with the case where the bracket is formed by welding. Therefore, the positional displacement between the case and the pivot shaft is prevented, and the weight reduction can be attempted while suppressing the strength reduction. It is preferred that the contact surface with which the bracket and the case are in contact and the pivot hole are formed by cutting on the basis of the molded product, as well as on the basis of the same reference position. This makes it possible to further suppress the positional displacement of the pivot shaft with respect to the case. Furthermore, it is preferred to use a die-cast casting rather than a casting by gravity casting as the molded product.

[5] The case (3) has a body portion (31) and a fixing portion (32) for fixing the bracket (4), and the fixing portion (32) is formed so as to protrude from the body portion (31) in the fixed direction (DF).

Therefore, the swingarm supporting structure can prevent strength of the body portion of the case from being reduced.

As described above, the thickness of the body portion is made different from that of the fixing portion, whereby the thickness required to function as a casing for the contents is provided by the body portion, and the thickness required to function as a support for the bracket is provided by the fixing portion, so that the bracket can be supported while preventing a weight increase. In the present embodiment, the fixing portions protrude from the body portion toward the center of the case in an inner surface of the case, whereby an outer surface of the case and the bracket can be brought close to each other, and a contact area can be increased. Further, in the case where the protruding portions orthogonal to the vehicle width direction toward the center of the case are formed as the original function of the case, in order to support partition walls in an inner space of the case and inner structural materials, and supply cooling water and the like, by using the protruding portions also as the fixing portions for fixing the bolts, the original rigidity of the case as the casing is easily retained, and an increase in the thickness of the case can be suppressed.

[6] The swingarm supporting structure comprises a shock absorber (6) for elastically supporting the swingarm (5) with respect to the bracket (4), and the bracket (4) has an absorber supporting portion (9) for supporting the shock absorber (6).

Both the pivot shaft and the shock absorber are supported by the bracket, whereby a positional relationship between the pivot shaft and a shock absorber-connecting position can be accurately set. In the present embodiment, the shock absorber supporting portion is constructed so as to be freely detachable from the bracket, which makes it possible to easily adjust the lever ratio of the shock absorber only by preparing a shock absorber supporting portion with a different supporting position as a replacement.

[7] In the swingarm supporting structure, the bracket (4) has a link supporting portion (44) for supporting a link mechanism (7) for adjusting a lever ratio of the shock absorber (6).

The pivot shaft, the shock absorber, and the link mechanism are each supported by the bracket, whereby a positional relationship among the pivot shaft, the shock absorber connecting position, and a link mechanism connecting position can be accurately set.

[8] The swingarm supporting structure comprises a shock absorber (6) for elastically supporting the swingarm (5) with respect to the bracket (4), and the plurality of fastening members are placed at positions away from a region hidden by the shock absorber (6) when seen from the fixed direction (DF).

Even if the shock absorber is attached to the bracket, the fastening members for fixing the bracket to the case are exposed in the fixed direction. Therefore, in the swingarm supporting structure, the bracket can be fixed to the case regardless of the order of attaching the bracket and the shock absorber, so that assembling work performance can be improved.

[9] The swingarm supporting structure comprises: a case (3) for storing a power unit; a bracket (4) for freely pivotally supporting a swingarm (5) up and down through a pivot shaft (10), the swingarm supporting an axle; and a main frame (2) extending rearward from a head pipe frame (1) and supporting the case (3), and the bracket (4) is formed separately from the main frame (2), and detachably fixed to the case (3).

Since the bracket is formed separately from the case, it is possible to prevent stresses given from the bracket from being concentrated around the pivot shaft of the case. Therefore, compared with the case where the swingarm is directly supported by the case, it is possible to prevent the rigidity of the case from becoming excessive. Further, the bracket is formed separately from the main frame, whereby the degree of freedom of design can be improved. For example, compared with the case where the main frame is formed with the pivot shaft, the size of the bracket can be reduced, and the weight and size of the vehicle can be reduced.

In the swingarm supporting structure of the present embodiment, the following modifications can be applied.

The present invention can be applied to a structure in which the swingarm is pivotally displaced in the up-and-down direction with respect to the pivot shaft formed in the bracket. For example, using a bracket fixed to the case at the rear with respect to a front wheel axle, the swingarm, which is pivotally displaced in the up-and-down direction with respect to the pivot shaft of the bracket, may support the front wheel axle. In this case, the bracket is fixed to the crankcase from the front to the rear.

Although the swingarm may be angularly displaceable around the pivot shaft, other structures may be used. For example, a structure in which swingarms are pivoted almost in parallel in the up-and-down direction may be adopted. Specifically, two pivot shafts at an interval in the up-and-down direction are set, the plurality of arms for forming a parallel link are formed from each pivot shaft, and the axle may be supported through the plurality of arms.

Although the present embodiment has a structure in which the bracket is fixed to a transmission case of the crankcase, it is only necessary that the bracket is fixed to the case for storing a power unit that is a driving source for driving the wheels. For example, the bracket may be fixed to a cylinder block. If the crankcase and the power transmission case are formed separately, the bracket may be fixed to the power transmission case. If no power transmission is provided, the bracket may be fixed to a case in which an internal combustion engine is stored. A structure in which the main frame and the bracket are integrally formed is also included in the present invention. Further, a motorcycle having a driving source other than the internal combustion engine is also included in the present invention. For example, in the case of an electric motorcycle, if a power unit case includes either of a motor case or a battery case, the case where the bracket is fixed to these cases is also included in the present invention.

Both ends of the shock absorber may be connected respectively to the arm bracket and the swingarm. Further, the shock absorber does not have to be connected to the arm bracket. Similarly, the link member does not have to be used. The positions and number of bolts are not limited to the present embodiment, and the case where they are made different is also included in the present invention. Although the fixed direction was set in the direction of heading for the front from the rear, it may also be set in the direction of heading for the obliquely up-and-down direction with respect to a horizontal direction, or in the direction of heading for the obliquely left-and-right direction with respect to a vertical surface extending in the front-and-rear direction.

The absorber bracket may be integrally molded. This makes it possible to more reliably prevent a displacement in the positional relationship between the pivot shaft and the shock absorber.

The main frame may have other shapes. Besides the pipe frame, the main frame may be formed by molding.

What is claimed is:

1. A swingarm supporting structure for a motorcycle, comprising:
    a case in which a power unit is to be stored;
    a bracket for freely pivotally supporting a swingarm up and down via a pivot shaft extending in a vehicle width direction, the swingarm being configured to support an axle; and
    a pair of main frames spaced apart in the vehicle width direction, the main frames extending rearward from a head pipe frame;
    wherein the bracket has a pivot hole for freely angularly diplaceably supporting the pivot shaft and a case fixing portion detachably fixed to the case in a direction intersecting the vehicle width direction, the case fixing portion being configured to extend in a vertical direction and in the vehicle width direction, and to have a thickness in a fixed direction, the fixed direction being a direction in which the bracket is fixed to the case;
    wherein the case fixing portion has an absorber supporting portion for supporting a shock absorber for elastically supporting the swingarm with respect to the bracket;
    wherein each of the main frames has a rear portion extending in a vertical direction; and
    wherein the bracket is located between the respective rear portions of the pair of main frames to connect to the pair of main frames.

2. A motorcycle comprising:
    a vehicle body frame;
    a rear frame;
    a case for storing a power unit therein;
    a bracket for freely pivotally supporting a swingarm up and down via a pivot shaft, the swingarm being configured to support an axle; and
    a shock absorber for elastically supporting the swingarm with respect to the bracket,
    wherein the bracket is detachably fixed to the case in a direction intersecting a vehicle width direction, the bracket having an absorber supporting portion for supporting the shock absorber, and the bracket being formed separately from the vehicle body frame and the rear frame;
    wherein the rear frame is fixed to the vehicle body frame; and
    wherein the bracket is fixed to the case and the vehicle body frame at a position further inward than a position at which the rear frame is fixed to the vehicle body frame with respect to the vehicle width direction.

3. The motorcycle according to claim 2,
wherein the case has a body portion and a fixing portion for fixing the bracket, and
the fixing portion is formed so as to protrude from the body portion in the direction intersecting the vehicle width direction.

4. The motorcycle according to claim 2,
wherein the bracket has a case fixing portion detachably fixed to the case in a direction intersecting the vehicle width direction, the case fixing portion being configured to extend in a vertical direction and in the vehicle width direction, and to have a thickness in a fixed direction, the fixed direction being a direction in which the bracket is fixed to the case; and
wherein the absorber supporting portion is located at a side of the case fixing portion of the bracket with respect to a center of the case fixing portion in the vehicle width direction.

5. The motorcycle according to claim 2, further comprising a plurality of fastening members for fixing the bracket to the case,
wherein each of the plurality of fastening members is placed at a position away from a region hidden by the shock absorber when viewed along the direction intersecting with the vehicle width direction.

6. The motorcycle according to claim 2,
wherein the bracket has a case fixing portion detachably fixed to the case in a direction intersecting the vehicle width direction, the case fixing portion being configured to extend in a vertical direction and in the vehicle width direction, and to have a thickness in a fixed direction, the fixed direction being a direction in which the bracket is fixed to the case; and
wherein a width of the case fixing portion in the vehicle width direction is smaller than a width of the case in the vehicle width direction.

7. The motorcycle according to claim 2, further comprising a plurality of fastening members for fixing the bracket to the case,
wherein the bracket has a plurality of insertion holes for receiving the plurality of fastening members, respectively, at an upper portion and a lower portion of the bracket.

8. The motorcycle according to claim 2,
wherein the bracket has a case fixing portion detachably fixed to the case in a direction intersecting the vehicle width direction, the case fixing portion being configured to extend in a vertical direction and in the vehicle width direction, and to have a thickness in a fixed direction, the fixed direction being a direction in which the bracket is fixed to the case; and
wherein the pivot shaft is adjacent to a front surface of the bracket and arranged within the thickness of the case fixing portion of the bracket.

9. The motorcycle according to claim 2,
wherein the bracket has a plurality of recesses formed in the direction intersecting the vehicle width direction, and ribs are formed between adjacent recesses.

10. The motorcycle according to claim 2,
wherein the bracket is formed by a mold separated in the direction intersecting the vehicle width direction.

11. The motorcycle according to claim 2, further comprising a plurality of fastening members for fixing the bracket to the case,
wherein the plurality of the fastening members are arranged on both sides of a divided surface of the case.

12. The motorcycle according to claim 2, wherein the vehicle body frame supports the case, and the rear frame supports a seat.

13. The motorcycle according to claim 2, wherein the rear frame is fixed to the vehicle body frame without being fixed to the case.

14. The motorcycle according to claim 2, wherein the bracket is fixed to the case at a position different from a position at which the rear frame is fixed to the vehicle body frame.

15. The motorcycle according to claim 2, wherein the bracket is fixed to the case and the vehicle body frame at a position lower than a position at which the rear frame is fixed to the vehicle body frame with respect to a vertical direction.

16. The motorcycle according to claim 2, wherein the bracket is fastened to the case in a direction intersecting the vehicle width direction; and
wherein the rear frame is fastened to the vehicle body frame in a vehicle width direction.

17. The motorcycle according to claim 2, wherein the bracket is fastened to the case in a direction intersecting the vehicle width direction, and is fastened to the vehicle body frame in the vehicle width direction.

* * * * *